US012374868B1

(12) United States Patent
Koenig

(10) Patent No.: US 12,374,868 B1
(45) Date of Patent: Jul. 29, 2025

(54) SPARK PLUG ELECTRODE AND SPARK PLUG

(71) Applicant: FEDERAL-MOGUL IGNITION GMBH, Neuhaus-Schierschnitz (DE)

(72) Inventor: Daniel Koenig, Rodental (DE)

(73) Assignee: FEDERAL-MOGUL IGNITION GMBH, Neuhaus-Schierschnitz (DE)

( * ) Notice: Subject to any disclaimer, the term of this patent is extended or adjusted under 35 U.S.C. 154(b) by 0 days.

(21) Appl. No.: 18/751,910

(22) Filed: Jun. 24, 2024

(51) Int. Cl.

| | |
|---|---|
| ***H01T 13/32*** | (2006.01) |
| ***H01T 13/16*** | (2006.01) |
| ***H01T 13/39*** | (2006.01) |
| ***H01T 21/02*** | (2006.01) |

(52) U.S. Cl.
CPC ............. *H01T 13/32* (2013.01); *H01T 13/16* (2013.01); *H01T 13/39* (2013.01); *H01T 21/02* (2013.01)

(58) Field of Classification Search
CPC ......... H01T 13/20; H01T 13/22; H01T 13/32; H01T 13/34; H01T 13/39
See application file for complete search history.

(56) References Cited

U.S. PATENT DOCUMENTS 3,538,372 A 11/1970 Terao et al.
3,921,020 A 11/1975 Wax et al.
4,881,913 A * 11/1989 Mann ...................... H01T 13/39 148/287
6,885,135 B2 * 4/2005 Kanao ..................... H01T 13/39 123/169 EL
9,871,351 B2 1/2018 Thomas et al.
2009/0241321 A1 10/2009 Farrell et al.

FOREIGN PATENT DOCUMENTS

DE 3820554 A1 12/1989
DE 3820555 A1 12/1989
JP 2021193656 A 12/2021
WO WO-9710632 A1 * 3/1997 ............. H01T 13/52

OTHER PUBLICATIONS

H.U. Borgstedt; The Corrosion Behavior of the Nickel-Based Alloy Inconel 625, Institute for Materials and Solid State Research; Dec. 1966.

* cited by examiner

*Primary Examiner* — Mariceli Santiago
(74) *Attorney, Agent, or Firm* — Reising Ethington PC

(57) ABSTRACT

A spark plug having a firing tip that is attached to a ceramic-conductive interface can help promote thermal conductivity at the spark gap. The spark plug electrode includes a conductive core having a conductive weld zone and a ceramic sheath extending at least partially around the conductive core and having a sparking portion. The ceramic sheath and the conductive core form a ceramic-conductive interface at the sparking portion, the ceramic-conductive interface at least partially surrounding the conductive weld zone of the conductive core. The firing tip is bonded at the sparking portion within the conductive weld zone or bonded so as to at least partially overlap the ceramic-conductive interface.

17 Claims, 6 Drawing Sheets

SPARK PLUG ELECTRODE AND SPARK PLUG

FIELD

This disclosure generally relates to spark plugs and other ignition devices for internal combustion engines, and more particularly, to ceramic spark plug electrodes.

BACKGROUND

For internal combustion engines, there is a clear trend towards carrying out combustion at higher temperatures and pressures, due at least partially to requirements for combustion engines relating to efficiency and pollutant emissions. Spark plugs used in these engine environments show increased wear, which can be traced back to spark erosion and the tendency to pre-ignite due to excessively hot electrode surfaces. Minimizing erosion of the electrodes by efficient cooling is thus desirable.

Current spark plug electrodes that are used in these high thermal load environments are designed as multi-component parts, usually a nickel based shell with a copper core, in order to ensure both optimized heat dissipation from the spark gap to the cylinder head and good resistance to spark erosion. However, with frequent load changes such as with start-stop applications, the nickel alloys used today (e.g., Inconel) have the problem of carbide precipitation at the grain boundaries around temperature ranges of 450-850° C.

FIGS. 1 and 2 show the typical spark plug electrodes of the prior art, subjected to thermal cycling analysis. The illustrated spark plug electrodes are bridging ground electrodes, showing undesirable cracking at the iridium firing tip and the Inconel bridging ground electrode. The arrows in FIG. 1 indicate cracking in both the tip and the ground electrode body, with FIG. 2 being a micrograph of the cracking in the ground electrode body. It was uncovered that the indicated cracks were all of the same type of origin, each having a seam of oxygen following the grain boundaries while also impacting the underlying base material. As indicated, cracks were observed at the top of the bridging ground electrode body where no heat affected zone is located.

Based on the testing, it was uncovered that this cracking may be at least partially due to low temperature oxidation of Inconel in start-stop applications. In particular, there is a low temperature oxidation of chromium in the 450-850° C. range. This oxidation occurs at least partially due to a precipitation of chromium carbides at the grain boundaries. EDX mapping illustrated chromium migration to the grain boundaries and oxidation of chromium carbides at the grain boundaries. The chromium carbides are oxidized at the grain boundaries at the working temperature of the spark plug when the engine is running in start-stop engine conditions. Since chromium oxide has a larger volume than chromium carbides, the structure is widened and this cycle is repeated every time the engine thermally cycles. Accordingly, an electrode that can better withstand thermal loading is desirable. Materials such as ceramic have been used in the past, but it can be difficult to attach the ceramic to the metal shell or attach a metal firing tip to a ceramic electrode body.

SUMMARY

According to one embodiment, there is provided a spark plug electrode and a spark plug having the electrode, with the electrode comprising a conductive core having a conductive weld zone and a ceramic sheath extending at least partially around the conductive core. The ceramic sheath and the conductive core form a ceramic-conductive interface at the sparking portion, the ceramic-conductive interface at least partially surrounding the conductive weld zone of the conductive core. The firing tip is bonded at the sparking portion within the conductive weld zone or bonded so as to at least partially overlap the ceramic-conductive interface.

In some embodiments, the conductive core and the ceramic sheath create a bridging ground electrode body. The bridging ground electrode body can extend from a first end to a second end with a central section between the first end and the second end, the firing tip being bonded in the central section. The conductive core can also extend from the first end to the second end.

In some embodiments, the conductive core and the ceramic sheath create a disc ground electrode body, with an annular-shaped tip that is bonded to the conductive weld zone and at least partially overlaps the ceramic-conductive interface. The firing tip can also be bonded to a second conductive weld zone and a second ceramic-conductive interface of the disc ground electrode body.

In some embodiments, the ceramic sheath is made of a ceramic material that is configured to minimize oxidation of chromium carbides in the conductive core, preferably a ceramic material having a thermal conductivity that is greater than 50 W/m/K and/or an electrical conductivity of greater than 4 siemens per meter. The ceramic material can be aluminum nitride based, and the conductive core can be made of a metal material that is tungsten based, to note one particular advantageous material combination.

In some embodiments, the ceramic sheath has a mechanical interlock portion configured to join a shell of a spark plug. The mechanical interlock portion can be a retention notch that spans from a terminal end to a distal end, potentially with a second retention notch that also spans from the terminal end to the distal end.

In some embodiments, the firing tip includes a plurality of locking projections, with one or more locking projections of the plurality of locking projections extending into the conductive core and one or more locking projections of the plurality of locking projections extending into the ceramic sheath.

Methods of manufacturing the spark plug electrode may include multi-material jetting the conductive core and the ceramic sheath or inserting the conductive core into the ceramic sheath to create the ceramic-conductive interface at least partially surrounding the conductive weld zone. The method may include attaching the firing tip within the conductive weld zone or at least partially overlapping the ceramic-conductive interface.

In accordance with another embodiment, there is provided a spark plug comprising a shell having an axial bore, an insulator disposed at least partially within the axial bore of the shell, a center electrode disposed at least partially within the axial bore of the insulator, a ground electrode configured to create a spark gap with the center electrode. The center electrode and the ground electrode at least partially overlap in an overlap zone, and the spark gap has a ceramic-conductive interface located at least partially in the overlap zone, with a ceramic portion being located directly at the spark gap so as to partially cover at least a conductive portion of the conductive core.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

DRAWINGS

Preferred example embodiments will hereinafter be described in conjunction with the appended drawings, wherein like designations denote like elements, and wherein.

DESCRIPTION

The spark plug and spark plug electrodes of the present disclosure can improve the life of the spark plug by effective minimization of cracking induced by thermal cycling. The ground electrode, the center electrode, or both the ground electrode and the center electrode include ceramic as opposed to a standard nickel based electrode body or sheath with a copper core. With ceramic electrodes, precipitation of carbides at the grain boundaries was not observed in the temperature range of about 450-850° C. Additionally, it is possible for the entire electrode to have a high thermal conductivity (e.g., greater than or equal to 160 [W/m/K]), including on surfaces which connect to the spark plug shell. With current electrodes, even those that may include some ceramic, the connection surfaces between the electrode and the shell is usually made entirely of a nickel alloy, which may at least partially inhibit heat transfer since the more thermally conductive core does not connect at the shell. With the present embodiments, an increased thermal conductivity of the electrode leads to better cooling of the sparking surfaces at the spark gap and thus to a longer service life of the spark plug. Additionally, compared to the nickel and copper electrodes typically used, a ceramic electrode is significantly more resistant to chemical influences (e.g., sulfur compounds, sulfuric acids, etc.), which are increasingly produced when landfill gas is burned.

However, there can be challenges with using ceramic for the electrode, as ceramic typically cannot be reliably welded to metal. Accordingly, the present disclosure seeks to solve some of these challenges by implementing various mechanical interlocks such as crimping with the spark plug shell. Also, the present electrodes may include a ceramic sheath and a conductive core, with the conductive core selectively exposed in certain regions to facilitate attachment to the shell, with a firing tip, or both.

The electrodes described herein can be used in spark plugs and other ignition devices including industrial plugs, aviation igniters, or any other device that is used to ignite an air/fuel mixture in an engine. This includes spark plugs used in automotive internal combustion engines, and particularly in stop-start engine applications, engines equipped to provide gasoline direct injection (GDI), engines operating under lean burning strategies, engines operating under fuel efficient strategies, engines operating under reduced emission strategies, or a combination of these. The various electrodes may provide improved ignitability, effective pad and electrode retention, and minimization of thermal cracking.

Figure 1:
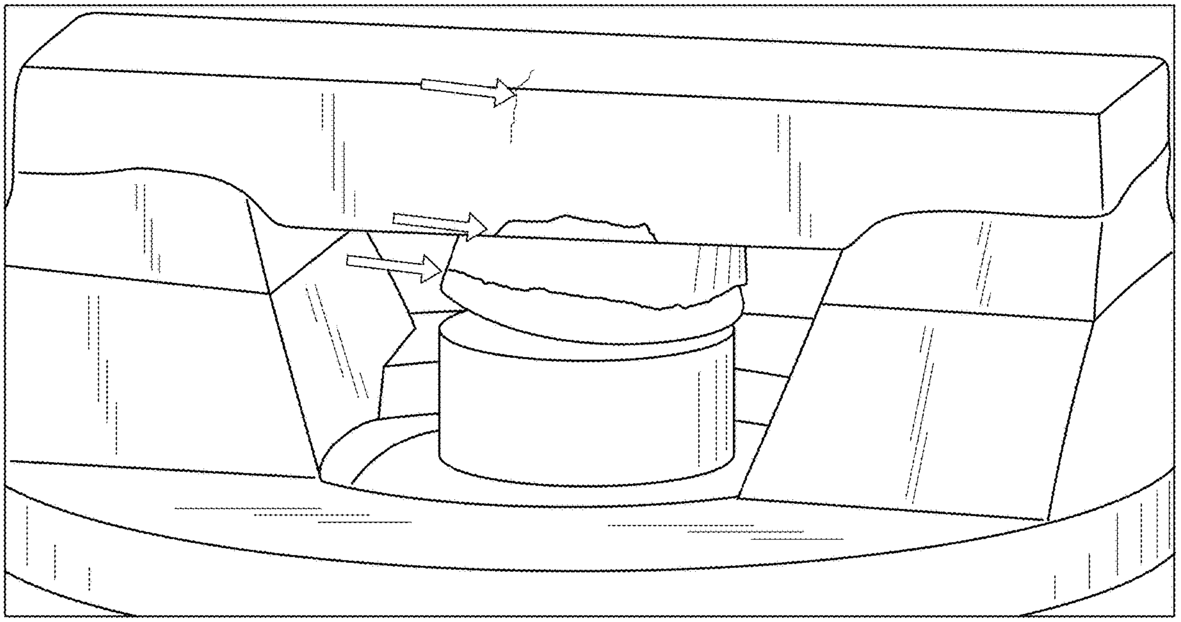
FIG. 1 (Prior Art)
FIG. 1 shows a bridging ground electrode in accordance with the prior art.
Figure 2:
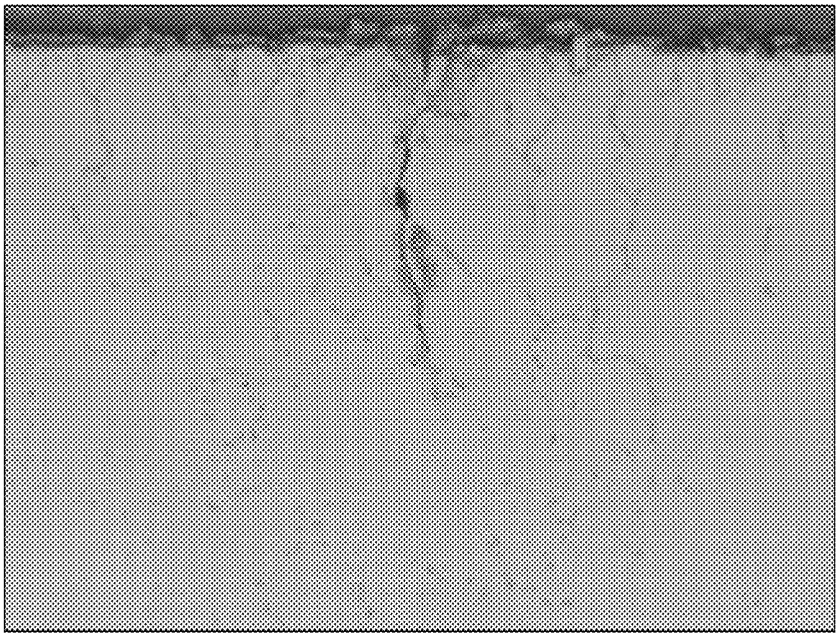
FIG. 2 (Prior Art)
FIG. 2 is a micrograph of one of the cracks in the bridging ground electrode of FIG. 1.
Figure 3:
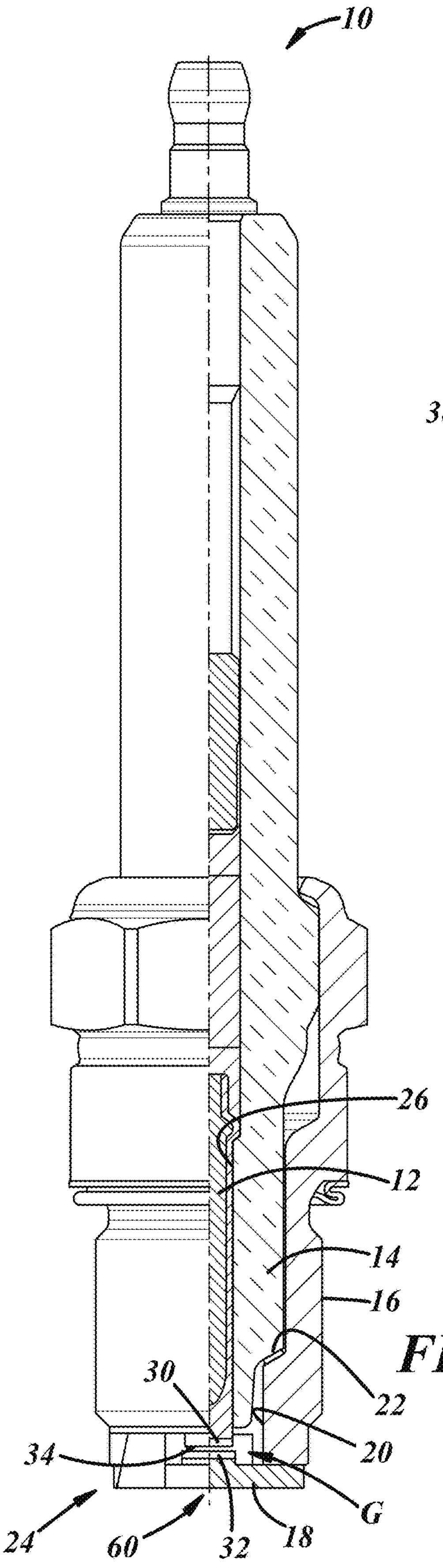
FIG. 3 is a cross-section of a spark plug in accordance with one embodiment.

Referring to FIG. 3, a spark plug 10 includes a center electrode 12, an insulator 14, a metallic shell 16, and a ground electrode 18. Other components can include a terminal stud, an internal resistor, various gaskets, and internal seals, all of which are known to those skilled in the art. The insulator 14 is generally disposed within an axial bore 20 of the shell 16 at an internal step 22, and may have an end portion exposed outside of the shell at a firing end 24 of the spark plug 10. The center electrode 12 may also include an exposed portion outside of an internal bore 26 of the insulator 14 at the firing end 24 of the spark plug 10. The center electrode 12 and/or the ground electrode 18 could be alternately configured than what is particularly illustrated in the figures, and the materials for which may vary from what is explicitly described herein. The insulator 14 is made of a material, such as a ceramic material, that electrically insulates the center electrode 12 from the metallic shell 16 (preferably a ceramic material that is less conductive than what is used for the electrodes 12, 18). The metallic shell 16 provides an outer structure of the spark plug 10, and can have threads for installation in an engine.

Figure 9:
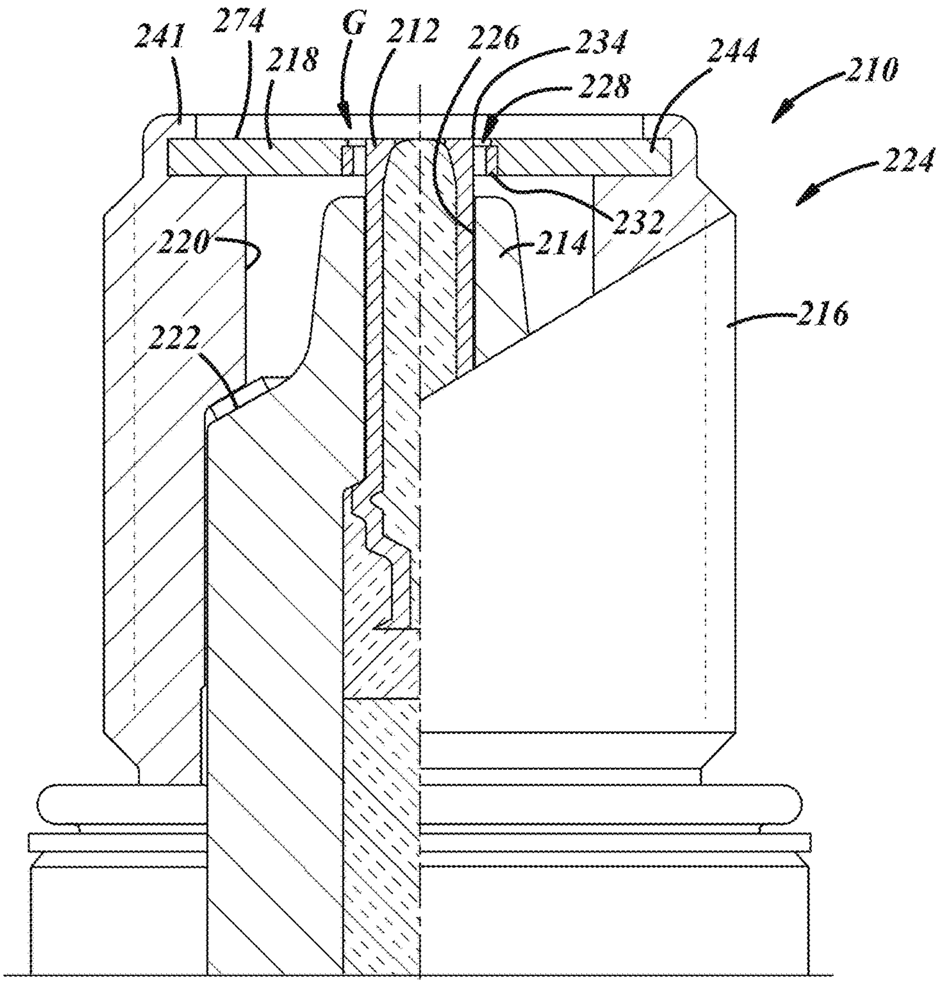
FIG. 9 shows a partial cross-section view of a spark plug firing end in accordance with another embodiment.

The center electrode 12 and the ground electrode 18 form a spark gap G in an overlap zone 28 where the center electrode and the ground electrode at least partially overlap along an axial axis (e.g., longitudinal axis A) or a radial axis (see e.g., FIG. 9). In an advantageous embodiment, the center electrode 12 has a firing tip 30 and the ground electrode 18 has a firing tip 32. The firing tips 30, 32 are generally aligned to encourage spark formation at the spark gap G. While in this embodiment, both the center electrode 12 and the ground electrode 18 have a similarly constructed firing tip 30, 32, it is possible for one of the center electrode or the ground electrode to have an alternately constructed firing tip, or for one or both electrodes to not have a firing tip at all, to cite a few example possibilities. In this embodiment, the firing tips 30, 32 define a sparking portion 34 that generally defines the spark gap G. In embodiments where there is no firing tip or only one firing tip, the sparking portion 34 is generally located in the overlap zone 28.

Each firing tip 30, 32 is advantageously made of a precious metal based material. In general, a precious metal based material includes 50 wt % or more of precious metal, such as platinum (Pt), iridium (Ir), rhodium (Rh), palladium (Pd), ruthenium (Ru), gold (Au), and/or alloys thereof. Other additives are possible, such as one or more alloying elements, rare earth elements, etc. In some embodiments, the firing pad 30, 32 is a multilayer structure such as a clad tape or multi-layer rivet, to cite a few possibilities. In such an embodiment, only a portion of the firing tip 30, 32 may be precious metal based. In yet other embodiments, the firing tip 30, 32 is made of a non-precious metal based material such as nickel (Ni) and/or tungsten (W), or an alloy thereof.

Additionally, other shapes and configurations are possible for the firing tips 30, 32, such as a columnar rod, rivet, annular ring, etc.

Figure 4:
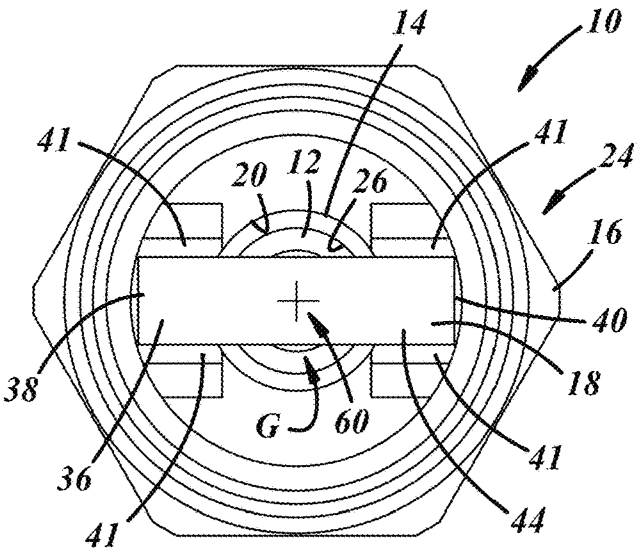
FIG. 4 is a bottom view of the spark plug of FIG. 3.
Figure 6:
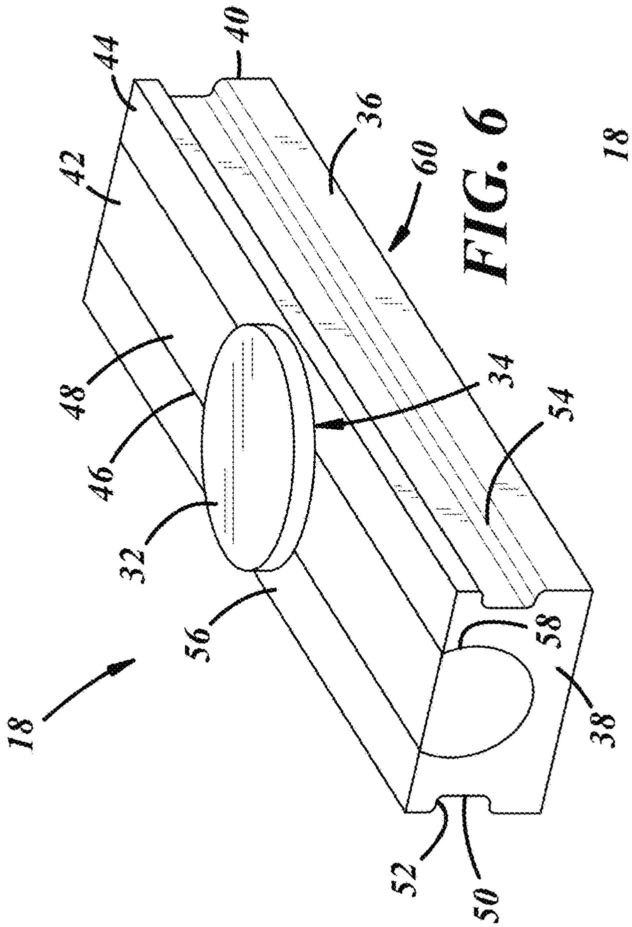
FIG. 6 is a perspective view of the ground electrode of FIGS. 3-5.
Figure 7:
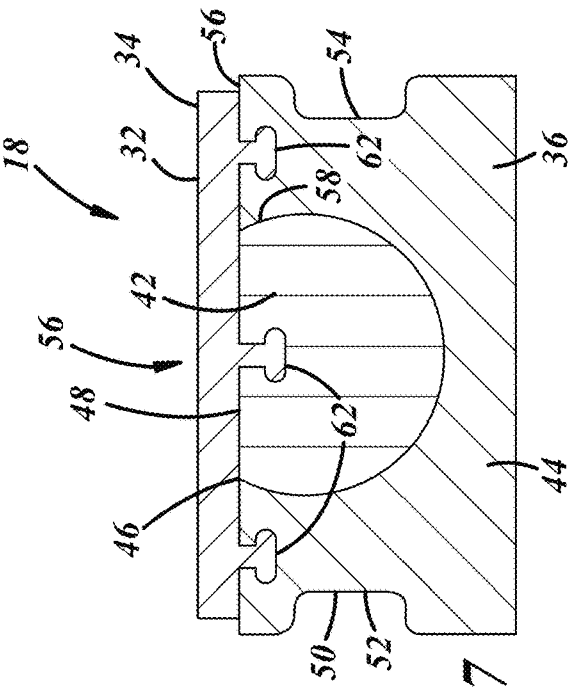
FIG. 7 is a cross-section view of the ground electrode of FIGS. 3-6.
Figure 5:
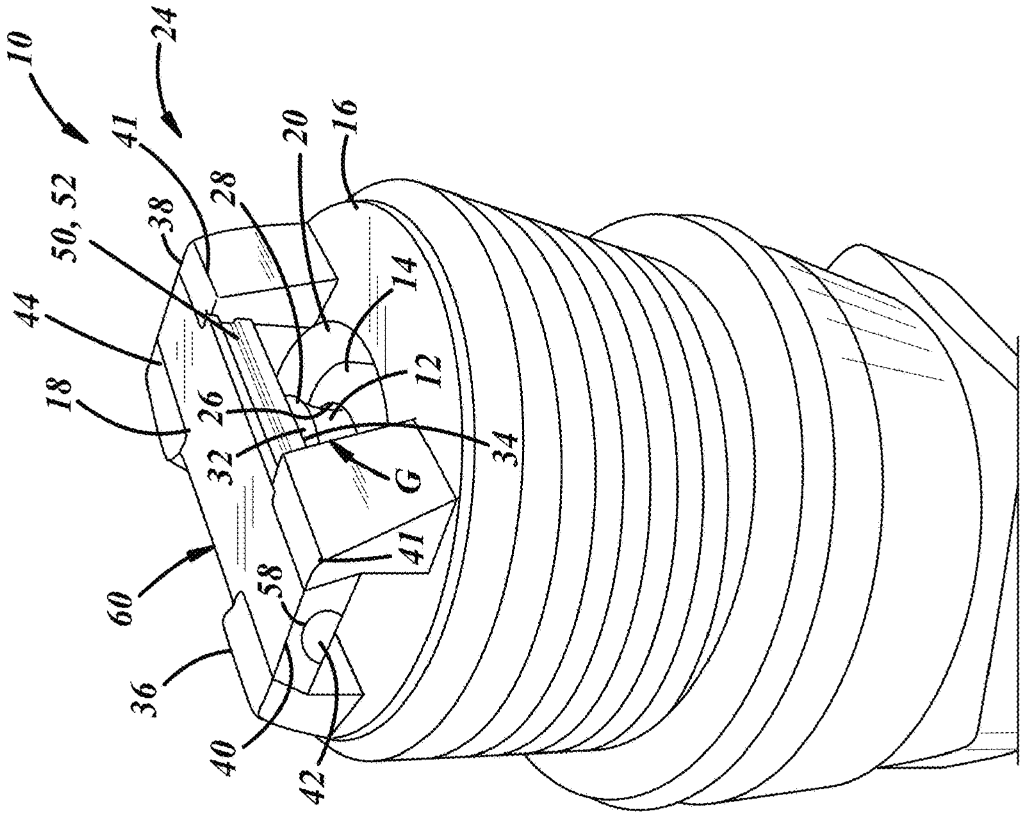
FIG. 5 is a perspective view of the firing end of the spark plug of FIGS. 3 and 4.

With particular reference to the embodiment illustrated in FIGS. 3-8 and labeled particularly in FIGS. 4-6, the ground electrode 18 has a bridging ground electrode body 36. The bridging ground electrode body 36 extends fully radially from a first end 38 to a second end 40, with both ends being attached to the shell 16. Having the two attachment points at each end 38, 40 can be beneficial with a ceramic bridging electrode body 36 given the difficulties with joining ceramic with the metal shell 16. In this embodiment, the shell 16 has a plurality of attachment projections 41 which are configured to help mechanically lock the ground electrode 18 in place. With the bridging ground electrode body 36, the shell 16 has four attachment projections 41 that extend predominantly axially and then radially engage the body on either side of each end 38, 40.

The ground electrode 18 includes a conductive core 42 and a ceramic sheath 44 that extends at least partially around the conductive core, surrounding a majority of the outer surface of the conductive core. The conductive core 42 and the ceramic sheath 44 together form a ceramic-conductive interface 46 that is either exposed at the overlap zone 28/sparking portion 34 or covered by the firing tip 32. Unlike previous ceramic electrodes, where the ceramic is located more completely or fully at the overlap zone 28/sparking portion 34, the conductive core 42 is at least partially exposed at a conductive weld zone 48, which can be used to facilitate improved sparking performance (e.g., when no firing tip is used) and/or facilitate attachment of the firing tip 32. Additionally, in this embodiment, given that the conductive core 42 extends all the way from the sparking portion 34 to the shell 16 (on both ends 38, 40), conductivity can be improved.

The conductive core 42 is made of a non-ceramic based material (e.g., a majority or fully metal-based material, less than 50 wt % ceramic or preferably no ceramic), and in one particularly advantageous embodiment, is a nickel (e.g., Inconel), steel, or tungsten alloy. Preferably, the conductive core 42 is sufficiently electrically conductive (e.g., greater than or equal to 4 siemens per meter (S/m)). In the illustrated embodiments, the conductive core 42 has a strand or wire configuration with a rounded cross-sectional shape. This can help with manufacturing and retention of the conductive core 42, as detailed further herein. At least a portion of the conductive core 42 is exposed, forming an exposed ceramic-conductive interface 46 and a conductive weld zone 48 that is situated at the spark gap G in the overlap zone 28. In this embodiment, the conductive core 42 is fully embedded within the ceramic sheath 44 such that the ceramic-conductive interface 46 is a planar surface at the sparking portion 34. This can help facilitate improved attachment of the firing tip 32.

The ceramic sheath 44 is a ceramic based material (e.g., a majority or fully ceramic based material having 50 wt % or more ceramic). The ceramic material is configured to minimize oxidation of chromium carbides in the conductive core 42, which can happen with the exposed conductive weld zone 48, particularly when the core is made from a nickel-based material such as Inconel. Advantageously, the ceramic material for the ceramic sheath 44 is more conductive than the ceramic material for the insulator 14, which is a separate component from the ceramic sheath. Unlike the insulator 14, the ceramic sheath 44 in this embodiment is joined to a distal end of the shell 16, closer to the spark gap G. Additionally, in the illustrated embodiments, the material for the ceramic sheath 44 is an aluminum nitride (AlN) ceramic, whereas the material for the insulator 14 is an alumina ceramic. Use of an aluminum nitride based ceramic, particularly with a tungsten based conductive core 42, is advantageous due to their similar material properties. There is a particular similarity in their thermal expansion coefficients ([10^6/K] AlN=4.5, W=4.4; compared with Cu=16.8, Ni=12.8), as well as with thermal conductivity ([W/m/K] AlN=170, W=164; compared with Cu=400, Ni=90). These similarities can help manage thermal variations in the materials, which is particularly beneficial in more intensive thermal cycling applications such as with stop-start engines.

Another example ceramic material includes Silicon Nitride-Molybdenum Disilicide (Si3N4-MoSi2). With this material, particularly with a multi-material jetting manufacturing process for example, it is possible to produce electrically conductive and electrically insulating layers, and for this purpose the solid content in the jetting print suspension is changed and the sintering process can also be adapted. This means that with the material Si3N4-MoSi2 both the sheath 44 and the core 42 of the electrode can be produced, then we have a solid component out of Si3N4-MoSi2; but it is printed once for electrically conductive and once for electrically insulating. This material has sufficient electrical properties, as it is both insulating and electrically conductive, and can be co-sintered. It is also conceivable to combine a sheath 44 made of aluminum nitrite (thermally conductive) and Si3N4-MoSi2 for the core 42.

The ceramic sheath 44 makes up the main body portion of the electrode 18, and helps thermally shield a majority of the surface area of the conductive core 42 from the spark gap G at the sparking portion 34. This can help minimize cracking. In the illustrated embodiment, the ceramic sheath 44 constitutes three outer sides of the ground electrode 18, and about half of the fourth outer side that faces the spark gap G. This arrangement allows for better shielding of the core 42, and helps to orient the ceramic-conductive interface 46 and the conductive weld zone 48 at the sparking portion 34 in the overlap zone 28.

In the illustrated embodiment, the ceramic sheath 44 has a mechanical interlock portion 50 in the form of two retention notches 52, 54 that help retain the ground electrode 18 with respect to the shell 16. Each retention notch 52, 54 spans from the first end 38 to the second end 40 on opposing lateral sides of the electrode 18. The retention notches 52, 54 help to structurally accommodate and interlock crimped attachment projections 41 in the shell 16. Given the difficulty in welding the components, the mechanical interlock 50, which provides a structural, mechanical link between the subcomponents, can help promote retention of the electrode 18 with respect to the shell 16.

The ceramic-conductive interface 46 is configured to at least partially surround the conductive weld zone 48. In this embodiment, the ceramic-conductive interface 46 forms a continuous, planar surface that helps facilitate a larger attachment zone for the firing pad or tip 32. Unlike other spark plugs having ceramic electrodes, the ceramic-conductive interface 46 provides a conductive weld zone 48 located directly at the sparking portion of the ceramic sheath 44, which allows the tip 32 to be more securely attached at the spark gap G at the overlap zone 28. In the illustrated implementations, the ceramic-conductive interface 46 has the ceramic sheath 44 and the conductive core 42 in direct contact with no gap therebetween. As detailed more fully below, this may be accomplished mechanically (e.g., an interference fit) or by using processes such as multi-material jetting. This arrangement between the ceramic sheath 44 and the conductive core 42 at the ceramic-conductive interface 46 can enhance the structure of the ground electrode 18 to promote connection between the two components and also facilitate improved joining with the tip 32. In embodiments in which the thermal expansion coefficient differences between the two components is less than about 0.6 W/M/K, a gap of up to about 0.2 mm is permissible due to the alloy composition. Additionally, the sheathing of the conductive core 42 with the ceramic sheath 44 can help minimize oxidation of carbides from the conductive core. Accordingly, the arrangement provides for a ceramic portion 56 of the ceramic sheath 44 located directly at the spark gap G, with the ceramic portion covering at least a conductive portion 58 of the conductive core 42 adjacent the spark gap G and shielding the core from oxidation. While the core 42 is largely shielded from oxidation, at least a part of the core at the conductive weld zone 48 is exposed at the spark gap G to facilitate conductive sparking and/or attachment of a firing tip 32.

In the embodiment of FIGS. 3-8, the ceramic-conductive interface 46 extends fully from the first end 38 to the second end 40 along a longest extent of the ground electrode 18. Between the first end 38 and the second end 40, there is a central section 60 in the middle (about 25% of the length on either side of the midpoint between the first and second ends). With the bridging ground electrode body 36, the firing tip 32 is advantageously fully located within this central section 60. However, it is possible for the tip 32 to be attached at other locations along the electrode 18, although having it fully within the conductive weld zone 48 or situated so as to at least partially overlap the ceramic-conductive interface 46 is desirable.

Figure 8:
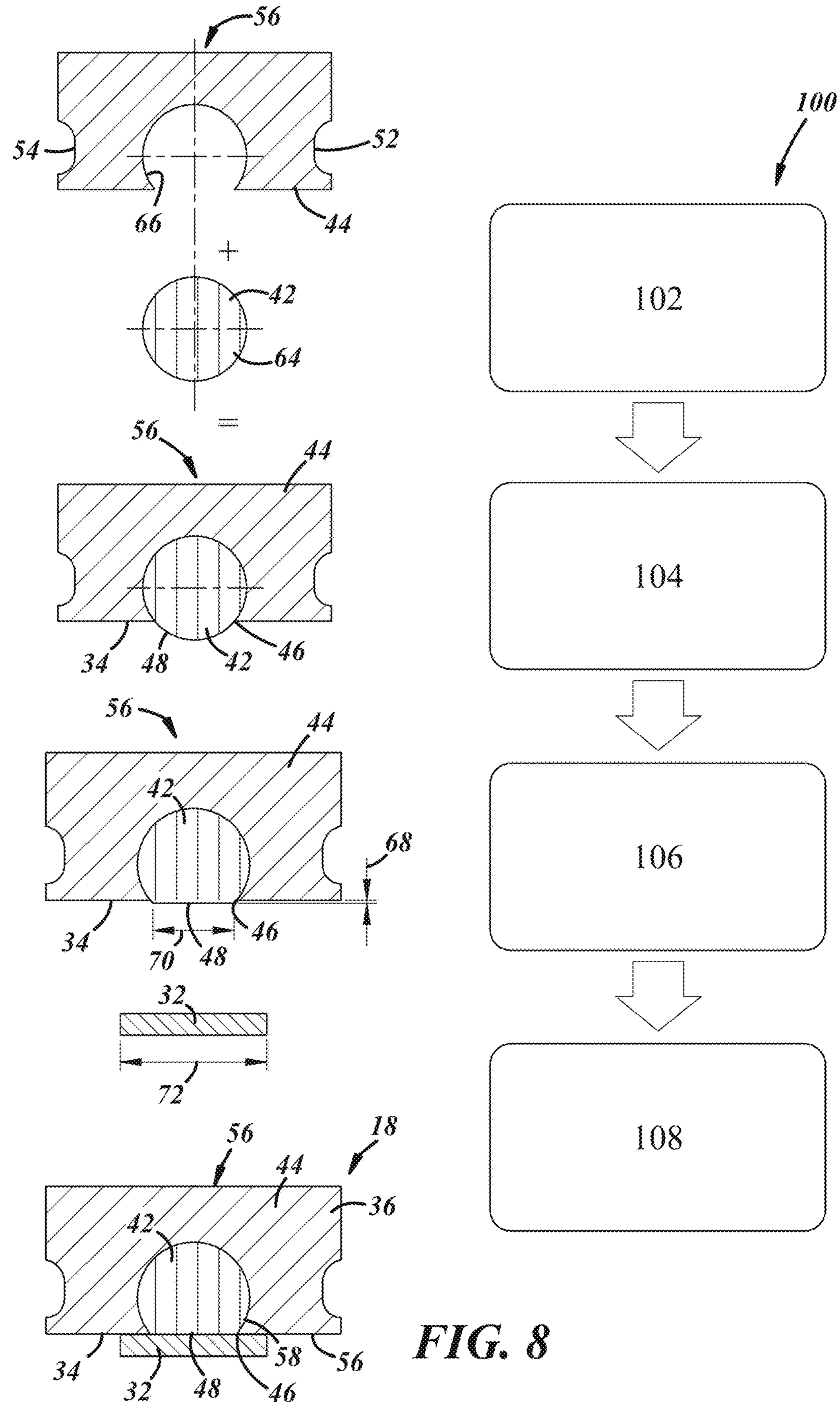
FIG. 8 is a flow chart and schematic illustration of an example manufacturing method.

FIG. 8 schematically illustrates a manufacturing method 100. The method 100 is only one option for creating a spark plug electrode 12, 18 for the spark plug 10, but other methods could be employed as well. For example, in one alternate embodiment, an additive manufacturing or 3-D printing process is used, such as multi-material jetting. With multi-material jetting, the materials are essentially sintered together to create a ceramic-metal material combination. Also, with multi-material jetting, for example, additional locking projections 62 (see e.g., FIG. 7) may be incorporated into the firing pad 32, with at least some locking projections extending into the ceramic sheath 44 and at least some locking projections extending into the conductive core 42. The locking projections 62 have a barbed or protruding edge to help with bonding between dissimilar materials (ceramic/metal). In other embodiments, such as the method of FIG. 8, the ceramic sheath 44 and the conductive core 42 are separate components that are then mechanically coupled.

In step 102 of the method 100, there is provided a conductive core 42 in the form of a wire 64 along with the ceramic sheath 44. The ceramic sheath 44 is advantageously made of a ceramic material having a high thermal conductivity such as aluminum nitride. The sheath 44 includes a rounded interior wall 66 and two retention notches 52, 54 on opposing sides. The ceramic sheath 44 can be produced by pressing and subsequent sintering or by machining, whether in the green state or after sintering, to cite a few examples. Additionally, machinable aluminum nitride blanks can be used for the sheath 44. The rounded interior wall 66 matches the contour of the wire 64 of the conductive core 42. The conductive core 42 has a geometric shape that makes it feasible for joining with the ceramic sheath 44. The conductive core 42 is made from an electrically conductive material (e.g., nickel, steel, or tungsten alloy), and helps promote heat transfer and electrical transmission to the spark plug shell 16. Additionally, the conductive core 42 provides an area more conducive for welding to attach a spark plug tip 30, 32.

Step 104 of the method involves joining the conductive core 42 and the ceramic sheath 44. Potential joining methods include plugging, for a transitional fit; pressing, for an oversize fit; or thermal joining, for a shrink fit. This step aligns the rounded interior wall 66 of the sheath 44 with the outer contour of the wire 64 to form a continuous ceramic-conductive interface 46 that follows the shape of the rounded interior wall 66 and exposes a conductive weld zone 48 at the sparking portion 34.

Step 106 involves flattening the conductive core 42 to help create a conductive weld zone 48 that is more conducive to tip 32 attachment. This also creates a generally planar ceramic-conductive interface 46 (e.g., "generally planar" means fully planar or a dimension 68 that is in a range of about-1.0 mm to +1.0 mm, or preferably-0.5 mm to +0.5 mm). This step 106 may be accomplished by machining, or it is possible for the conductive core 42 have the flattened area prior to assembly with the sheath 44. In the illustrated embodiment, the conductive weld zone 48 has a width 70 that may range from about 0.01 mm to 6.00 mm, inclusive, which is generally smaller than a width 72 of the firing tip 32 (e.g., about 0.3 mm to 6 mm). This arrangement can provide more ceramic toward the sparking portion 34 to help promote thermal transfer.

Step 108 involves attaching the firing tip 32. In this implementation, the firing tip 32 is attached so as to overlap the ceramic-conductive interface 46 and attach at the conductive weld zone 48 of the conductive core 42. The attachment between a metal firing tip 32 (e.g., a tungsten alloy, a nickel alloy, or a precious metal alloy such as iridium platinum, ruthenium, palladium) and the metal conductive core 42 (e.g., a nickel alloy, a steel alloy, or a tungsten alloy) is preferred and allows for electrical conductance from the spark gap G. The tip 32 can be welded to the conductive weld zone 48 (e.g., laser or resistance welding) or otherwise joined (e.g., shrink-fitted into a pocket or crimped). Furthermore, the tip 32 can be additively manufactured directly onto the ceramic-conductive interface 46 or conductive weld zone 48 using an additive manufacturing method (e.g., multi-material jetting, powder bed or powder nozzle).

As detailed herein, other manufacturing methods beyond the manufacturing method 100 illustrated in FIG. 8 are certainly possible. Additionally, it is possible to include other or alternate steps. For example, with the illustrated spark plug 10, the electrode 18, once formed via the method 100, can be crimped into place such that the attachment projections 41 of the shell 16 are crimped into the retention notches 42, 54 of the ceramic sheath 44. In some embodiments, such as with multi-material jetting, there may be an additional conductive weld zone 48 located to help with welding the electrode 18 to the shell 16. Other potential manufacturing steps and methods are certainly possible.

Figure 10:
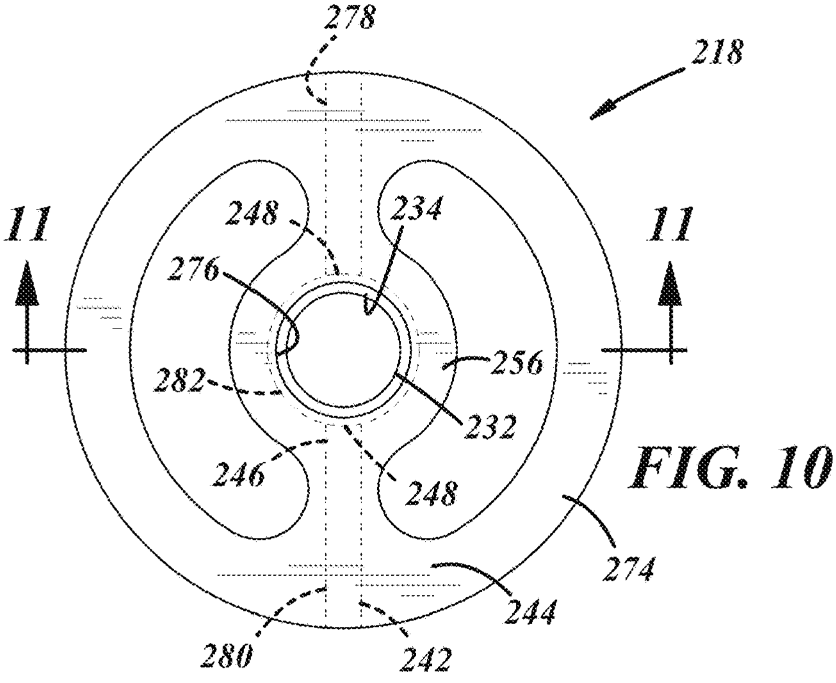
FIG. 10 is a bottom view of the ground electrode of the spark plug of FIG. 9.
Figure 11:
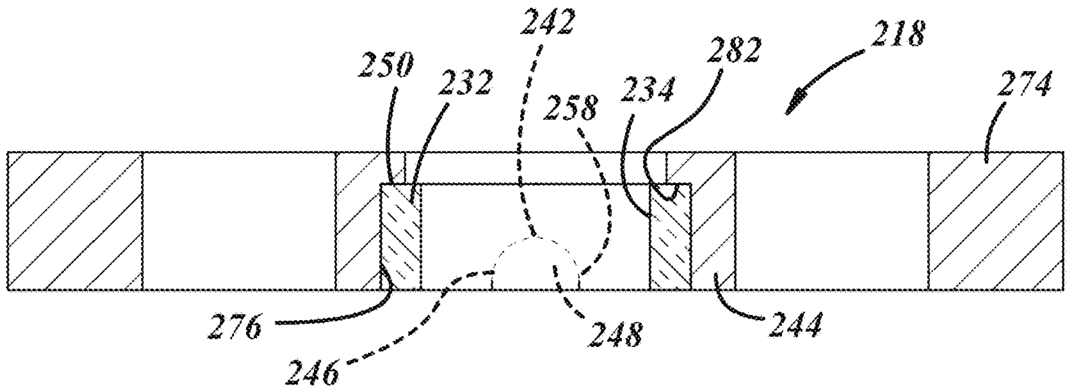
FIG. 11 is a cross-section view of the ground electrode of the spark plug of FIGS. 9 and 10.

FIGS. 9-11 illustrate a second embodiment of a spark plug 210 (wherein like reference numerals denote like components). In this embodiment, the ground electrode 218 has a disc-shaped body 274. This embodiment is alternately shaped compared to the bridging ground electrode body 36, and yet other shaped bodies are feasible as well (e.g., rod-shaped, wire-shaped, columnar, etc.). With the ground electrode 218, there is an annular-shaped ground electrode firing tip 232 that is attached to an inner ring area 276 of the disc-shaped body 274. This inner ring area 276 includes two ceramic-conductive interfaces 246 (one illustrated in phantom in FIG. 11, for example) that each surround a separate conductive weld zone 248. As shown more particularly in FIG. 10, the conductive core 242 includes two radially extending prongs 278, 280 that extend from the inner ring area 276.

The electrode 218 in this implementation includes various mechanical interlock features such as a retaining edge 282 to help keep the annular-shaped firing tip 232 in place. The retaining edge 282 is a mechanical interlock portion in the ceramic sheath 244 which can help with retention of the firing tip 232. Additionally, in this implementation, the shell 216 may include an attachment projection 241 to help crimp the ground electrode 218 into place. Other mechanical interlock portions 250 may be included depending on the arrangement and/or shape of the ground electrode 218.

Figure 12:
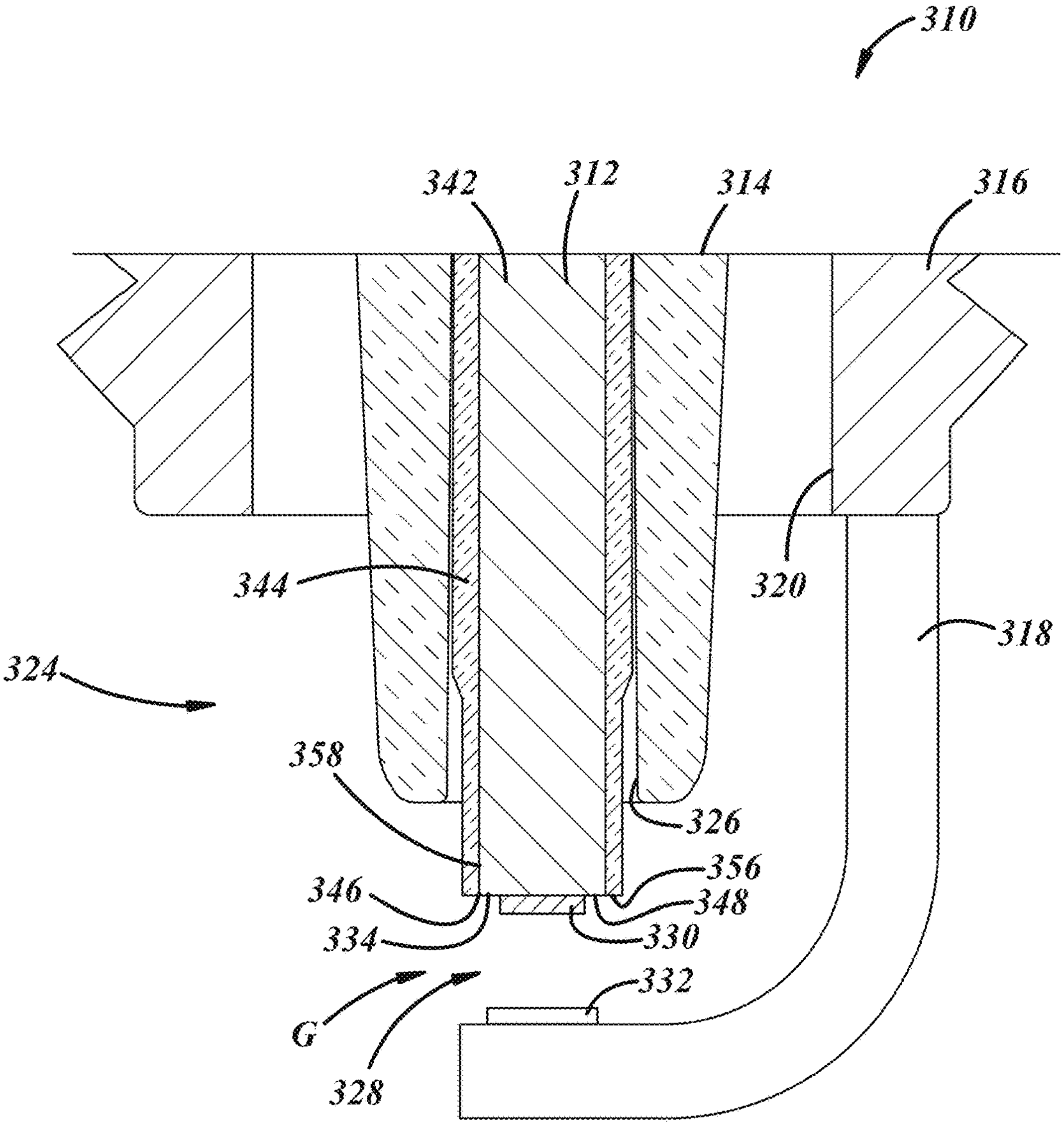
FIG. 12 is a cross-section view of a spark plug firing end in accordance with another embodiment.

FIG. 12 illustrates a third embodiment of a spark plug 310. In this implementation, the center electrode 312 has the conductive core 342 and ceramic sheath 344 arrangement. Additionally, in this embodiment, the firing tip 330 is located wholly within the conductive weld zone 348 such that it is fully surrounded at the sparking portion 334 by the ceramic-conductive interface 346. In this embodiment, given the more traditional structure of each electrode 312, 318, a production method such as multi-material jetting may be preferred to help co-sinter the components 342, 344 together. Other center electrode 312 and ground electrode 318 shapes and configurations are certainly possible.

It is to be understood that the foregoing is a description of one or more preferred example embodiments. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C."

The invention claimed is:

1. A spark plug electrode, comprising:

a conductive core having a conductive weld zone;

a ceramic sheath extending at least partially around the conductive core and having a sparking portion, wherein the ceramic sheath and the conductive core form a ceramic-conductive interface at the sparking portion, the ceramic-conductive interface at least partially surrounding the conductive weld zone of the conductive core; and a firing tip bonded at the sparking portion within the conductive weld zone or bonded so as to at least partially overlap the ceramic-conductive interface, wherein the ceramic sheath has a mechanical interlock portion configured to join the firing tip or a shell of a spark plug.

2. The spark plug electrode of claim 1, wherein the conductive core and the ceramic sheath create a disc ground electrode body.

3. The spark plug electrode of claim 2, wherein the firing tip is an annular-shaped tip that is bonded to the conductive weld zone and at least partially overlaps the ceramic-conductive interface.

4. The spark plug electrode of claim 3, wherein the firing tip is also bonded to a second conductive weld zone and a second ceramic-conductive interface of the disc ground electrode body.

5. The spark plug electrode of claim 1, wherein the ceramic sheath is made of a ceramic material that is configured to minimize oxidation of chromium carbides in the conductive core.

6. The spark plug electrode of claim 1, wherein the conductive core is nickel based and the ceramic sheath is made of a ceramic material that has an electrical conductivity greater than or equal to 4 siemens per meter.

7. The spark plug electrode of claim 1, wherein the mechanical interlock portion is a retention notch.

8. The spark plug electrode of claim 7, wherein the retention notch spans from a first end to a second end, and a second retention notch also spans from the first end to the second end.

9. The spark plug electrode of claim 1, wherein the firing tip includes a plurality of locking projections, with one or more locking projections of the plurality of locking projections extending into the conductive core and one or more locking projections of the plurality of locking projections extending into the ceramic sheath.

10. A method of manufacturing the spark plug electrode of claim 1, comprising the step of multi-material jetting the conductive core and the ceramic sheath.

11. A method of manufacturing the spark plug electrode of claim 1, comprising the steps of:

inserting the conductive core into the ceramic sheath to create the ceramic-conductive interface at least partially surrounding the conductive weld zone; and attaching the firing tip within the conductive weld zone or at least partially overlapping the ceramic-conductive interface.

12. A spark plug comprising the spark plug electrode of claim 1.

13. A spark plug electrode, comprising:

a conductive core having a conductive weld zone;

a ceramic sheath extending at least partially around the conductive core and having a sparking portion, wherein the ceramic sheath and the conductive core form a ceramic-conductive interface at the sparking portion, the ceramic-conductive interface at least partially surrounding the conductive weld zone of the conductive core, wherein the conductive core and the ceramic sheath create a bridging ground electrode body; and a firing tip bonded at the sparking portion within the conductive weld zone or bonded so as to at least partially overlap the ceramic-conductive interface.

14. The spark plug electrode of claim 13, wherein the bridging ground electrode body extends from a first end to a second end with a central section between the first end and the second end, the firing tip being bonded in the central section.

15. The spark plug of claim 14, wherein the conductive core extends from the first end to the second end.

16. A spark plug electrode, comprising:

a conductive core having a conductive weld zone;

a ceramic sheath extending at least partially around the conductive core and having a sparking portion, wherein the ceramic sheath and the conductive core form a ceramic-conductive interface at the sparking portion, the ceramic-conductive interface at least partially surrounding the conductive weld zone of the conductive core, wherein the ceramic sheath is made of a ceramic material that is configured to minimize oxidation of chromium carbides in the conductive core, wherein the ceramic material is aluminum nitride based; and a firing tip bonded at the sparking portion within the conductive weld zone or bonded so as to at least partially overlap the ceramic-conductive interface.

17. The spark plug electrode of claim 16, wherein the conductive core is made of a metal material that is tungsten based.

* * * * *